T. E. KING.
SKATE WHEEL.
APPLICATION FILED AUG. 14, 1911.
1,006,952.
Patented Oct. 24, 1911.
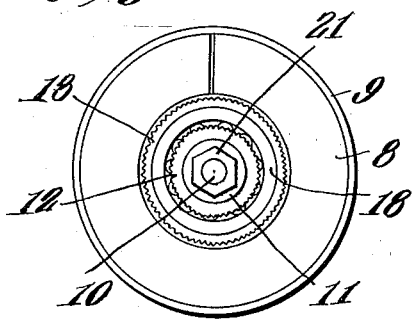
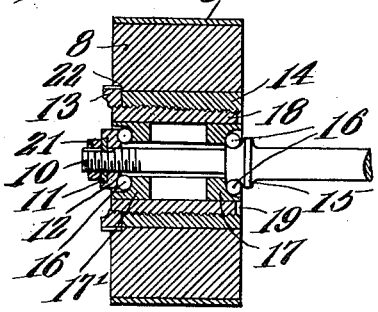
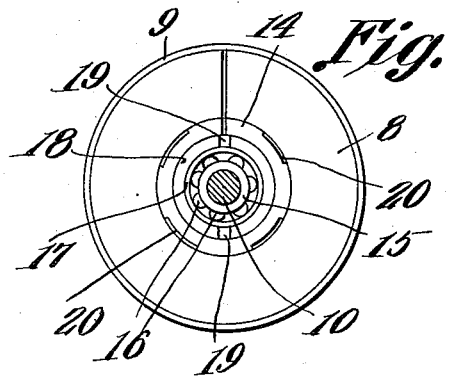
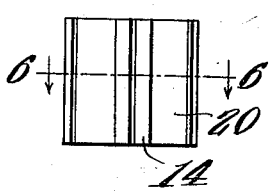
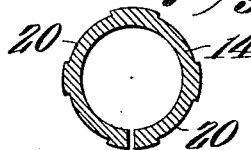
Witnesses
T. E. King,
Inventor
by C. A. Snow & Co.
Attorneys

UNITED STATES PATENT OFFICE.

THOMAS E. KING, OF STOCKTON, CALIFORNIA.

SKATE-WHEEL.

1,006,952. Specification of Letters Patent. Patented Oct. 24, 1911.

Application filed August 14, 1911. Serial No. 644,018.

*To all whom it may concern:*

Be it known that I, THOMAS E. KING, a citizen of the United States, residing at Stockton, in the county of San Joaquin and State of California, have invented a new and useful Skate-Wheel, of which the following is a specification.

This invention relates to roller skate wheels and has for its object to provide a wheel of this character having a removable rim or tire which after becoming worn by continuous use can be replaced, thus dispensing with the necessity of replacing the entire wheel upon the tire becoming worn, and thus reducing the cost of maintenance of roller skates.

Another object of the invention is to provide a novel joint between the hub of the wheel and the wheel body whereby the expansion or shrinkage of the wheel body can be compensated for. In this connection means are also provided for permitting the tires to be removed and replaced without interfering with the joint between the wheel body and the hub member.

With the above objects in view this invention is embodied in the novel arrangement, construction and combination of parts as hereinafter described and as illustrated in the accompanying drawings, wherein similar reference characters indicate similar parts, and in which,—

Figure 1 is a side elevation of a wheel embodying the invention. Fig. 2 is a vertical central section thereof. Fig. 3 is another side elevation of the wheel taken from the opposite side. Fig. 4 is an elevation of the tubular hub. Fig. 5 is an elevation of the bushing fitting within the wheel body and into which the hub fits. Fig. 6 is a section on the line 6—6 of Fig. 5.

Referring specifically to the drawings, 8 designates the wheel body comprising a split annular member of wood, composition, or other material. On the periphery of the wheel body 8 is arranged the metallic tire or rim 9 and a split bushing 14 sets within the opening of the wheel body. This bushing 14 has a plurality of longitudinal channels 20 along the periphery thereof and the interior thereof is screw threaded and is tapered. The wheel body 8 is provided with an annular rabbet 22 on the inner edge of the front side of the same and the front end of the bushing 14 terminates flush with the said rabbet. A tubular hub member 18 is externally screw threaded, which screw threads are also tapered, and within the ends of the said tubular hub are arranged the respective ball cups 17 and 17′. This tubular hub is screwed into the bushing 14 and it will be seen that the screw threads of the two members being tapered causes the bushing to be expanded as the hub is screwed inward to be tightly clamped within the wheel body. The tubular hub member 18 is provided on its inner end with diametrically opposed notches 19 by means of which the same can be revolved by the aid of a suitable spanner wrench. The outer end of the tubular hub 18 projects beyond the bushing 14 and a retaining ring 13 having the periphery thereof knurled is screwed onto the projecting end thereof to bear against the end of the bushing 14 and fit within the annular rabbet 22 of the wheel body.

The journal of the roller skate axle is designated at 10 having the inner ball cone 15 integral therewith and an outer ball cone 12 screw threaded thereon. Between the ball cones 15 and 12 and the respective ball cups are arranged the balls 16, for providing the usual anti-friction mounting of the wheel on the journal. The cone 12 is held on the journal by means of a nut 11 screwed onto the end thereof bearing against the washer 11 disposed between the said ball cone and nut.

When it is desired to remove the tire of the wheel, a suitable spanner wrench is engaged with the tubular hub 18 by means of the diametrically opposed notches 19 on the inner end thereof and the tire is gripped by a suitable device and is removed from the wheel body by twisting same off the front end thereof, the wheel body being clamped on the bushing 14 and engaging the retaining ring 13 is prevented from being removed and is thus held in position while the tire is removed and replaced. The wheel body 8 being split may accommodate various tires and by screwing the tubular hub 18 within the bushing 14 the bushing can be expanded or contracted as desired or necessary. In the use of the roller skate wheel, the wheel body frequently expands causing it to become loose on the bushing 14, and should this be the case by turning the hub within the bushing the same may be expanded to be again tightly clamped within the wheel body.

What is claimed is:—

1. In a wheel of the character described, an annular wheel body having an annular rabbet on the inner edge of one side of same, a split bushing fitting within the said wheel body and having the end thereof flush with the rabbet, the said bushing having internal tapered screw threads, a hub member having external tapered screw threads engaging in the said bushing, and a retaining ring screw threaded on the end of the said hub member which bears against the end of the bushing and fits into the said rabbet.

2. In a wheel of the character described, a split annular wheel body, a tire fitting on the periphery thereof, an expandable bushing fitting in the said wheel body, and a tapered hub member fitting in the said bushing to expand same.

In testimony that I claim the foregoing as my own, I have hereto affixed my signature in the presence of two witnesses.

THOMAS E. KING.

Witnesses:
A. B. RINEHART,
L. T. MOSS.

Copies of this patent may be obtained for five cents each, by addressing the "Commissioner of Patents, Washington, D. C."